June 28, 1932.   J. B. MILLIGAN   1,865,202
ADJUSTABLE KING PIN BEARING
Filed Feb. 12, 1931
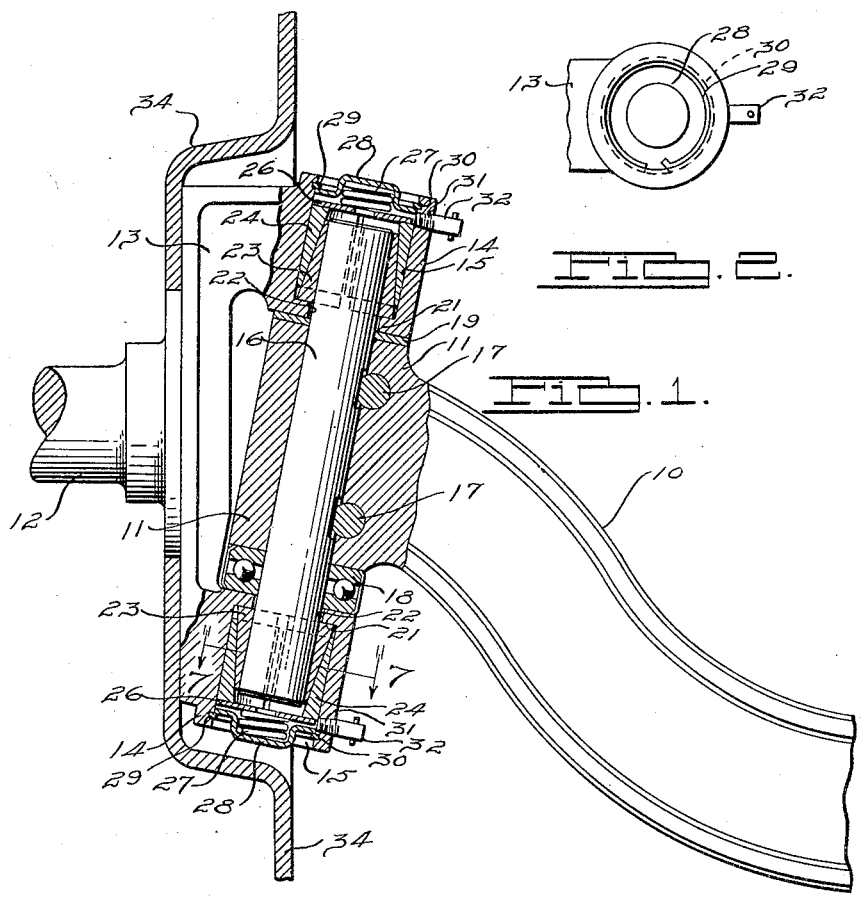
FIG. 2.
FIG. 1.
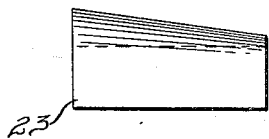
FIG. 3.
FIG. 4.
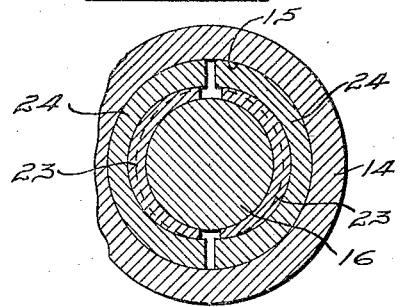
FIG. 7.
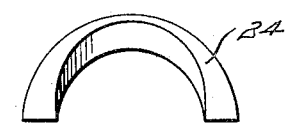
FIG. 5.
FIG. 6.
INVENTOR
John B. Milligan.
BY
Harness, Dickey, Pierce & Hann,
ATTORNEYS.

Patented June 28, 1932

1,865,202

UNITED STATES PATENT OFFICE

JOHN B. MILLIGAN, OF COLUMBUS, OHIO, ASSIGNOR TO THE COLUMBUS AUTO PARTS COMPANY, A CORPORATION OF OHIO

ADJUSTABLE KING PIN BEARING

Application filed February 12, 1931. Serial No. 515,239.

My invention relates to bearings and particularly to adjustable bearings for a king bolt.

The main objects of my invention are to provide improved bearings for a king bolt which will be automatically adjusted to compensate for wear between the bearing surfaces; to provide a bearing surface which continually contacts with the shaft through its entire area irrespective of the amount of wear occurring between the shaft and bearing surface; to provide a construction in which the center of the shaft will not be displaced when adjustment takes place as wear occurs between the engaging surfaces; to provide a shaft with a bearing surface which contacts with the surface of the shaft with a uniform pressure at all times; and to provide a construction which may be economical to manufacture and may be readily assembled.

Numerous other objects and features of novelty of my invention will be either specifically pointed out or will become apparent when referring, for a better understanding of my invention, to the following description in conjunction with the accompanying drawing, wherein:

Figure 1 is a broken view, partly in section and partly in elevation, of a steering knuckle spindle and shaft embodying features of my invention, Fig. 2 is a broken top plan view of a portion of the structure shown in Fig. 1, Fig. 3 is an enlarged view of a bearing shell shown in Fig. 1, Fig. 4 is an end view of the structure shown in Fig. 3, Fig. 5 is an enlarged end view of a wedge employed in the structure shown in Fig. 1, Fig. 6 is a side view of the structure shown in Fig. 5 and Fig. 7 is an enlarged sectional view of the structure shown in Fig. 1 taken along the line 7—7 thereof.

Considerable wear has always occurred between the bearing surfaces of the steering knuckles of an automobile which caused considerable consternation because of the shimmying which resulted therefrom and also because of the difficulty of retaining the wheels in predetermined alignment with each other. The only remedy that has been suggested heretofore, to overcome these difficulties, was to renew the king pin, or spindle shaft, and the associated bearings. This operation entailed considerable expense and required the removal of the automobile from service.

In my present improved construction disclosed herein, the spindle shaft, or king pin, is provided with adjustable bearings which have been described and claimed in my copending application filed on an even date herewith, bearing Serial Number 515,238 and was assigned to the assignee of the present invention. The employment of the bearing shells and the associated wedges causes the engaging surface of the bearing shells and the shaft to constantly adjust themselves relative to each other because of the bias of the associated mechanism which forces the wedges between the wall of the bearing housing and the bearing shells.

Referring more particularly to Fig. 1 of the drawing, my invention comprises in general an axle 10 having a hollow boss 11 on each of its ends. It is to be understood that a spindle 12 is provided on each end of the axle and are exactly similar but oppositely disposed and for this reason only a single end of the shaft and a steering spindle is disclosed in the drawing and will now be described. The spindle 12 is provided with a yoke 13 which spans the boss 11 and is provided at each of its ends with hollow bosses 14 having inner walls 15 of cylindrical shape.

The shaft 16 extends within the bosses 14 and the boss 11 and is retained in fixed position against rotation and longitudinal movement within the boss 11 by the pins 17. Suitable bearings 18 and 19 are provided between the contiguous surfaces of the bosses, the bearing 18 being of the ball or roller type to prevent wear and friction because substantially all of the weight supported by the front axle is transferred to the wheel through the lower bearing. The bearing 19 at the top of the axle is shown as a washer made from a suitable material to reduce the friction between the upper engaging surface.

An inturned flange 21 is provided on the inner surface of the bosses 14 which form central aligned openings 22 of slightly greater diameter than that of the shaft 16. Bearing shells 23 are provided about the shaft in abutting relation with the flange 21 and are shown enlarged in Figs. 3 and 4 as being provided with an inner and outer semi-cylindrical surface which are angularly disposed relative to each other. Wedges 24 are provided between the bearing shells 23 and the wall 15 of the bosses 14 and are shown enlarged in Figs. 5 and 6 as being provided with inner and outer semi-cylindrical surfaces which are disposed at an angle to each other. The angular relation between the surfaces of the shells 23 and the wedges 24 are substantially equal with the radius of the inner surface of the bearing shells 23 being substantially equal to the radius of the shaft 16 and the radius of the outer surface thereof being substantially equal to the radius of the inner surface of the wedges 24, the outer surfaces of the wedges 24 having a radius substantially equal to the radius of the wall 15 of the bosses 14.

In Fig. 7 I have shown an enlarged section of one of the bosses 14 for the purpose of illustrating the relation between the shaft, the bearing shells, the wedges and the wall 15 of the bosses. Since all of the adjacent engaging surfaces are of substantially the same radius throughout the length of the members it will be apparent that the surfaces engage each other at every point throughout their entire areas irrespective of the amount of wear occurring between the shaft and the bearing shells and also irrespective of the position of the wedges axially within the bosses 14.

Automatic means are provided at each end of the bosses 14 for urging the wedges 24 toward the flanges 21 for the purpose of forcing the bearing shells 23 into firm engagement with the surface of the ends of the shaft 16. A plate 26 is biased against the ends of the wedges 24 by a spring 27 which is supported within the confines of the inner wall 15 of the boss 14 by a cupped washer 28 which is retained within the boss by an expansible spring lock ring 29 which is seated in a groove 30 formed around the periphery of the wall 15 closely adjacent to the ends of the bosses, as shown in Figs. 1 and 2. In this construction the bias of the spring 27 forces the plate 26 against the wedges which are moved longitudinally relative to the surface 15 to force the bearing shells 23 tightly against the ends of the shaft 16.

The bosses 14 are provided with threaded apertures 31 for the purpose of receiving an exteriorly threaded lubricating fitting 32 and the plate 26 is provided with a central opening to provide a passage from the lubricating fitting 32 to the shaft.

In Fig. 7 it will be noted that the wedges and the bearing shells are spaced from each other to permit the lateral movement thereof as wear occurs between the surface of the shaft and the bearing shell. The lubricant passing through the opening in the plate 26 is forced upwardly in the space between the bearing shells and the wedges to thereby intimately contact with the shaft in the vicinity of the bearing shell to lubricate the adjacent rubbing surfaces.

The spaces between the bearing shells and the wedges are in direct communication with the space between the shaft 16 and the flanges 21 which thereby permit the lubricant to be forced beyond the bosses 14 into intimate engagement with the bearings 18 and 19 to lubricate the balls and races of the bearing 18 and the engaging rubbing surfaces of the bearing 19.

In Fig. 1, I have disclosed a brake drum housing 34 supported on the yoke 13 at the base of the spindle 12 for the purpose of illustrating the mounting of the bearings with respect thereto. It will be noted that my present construction in no way interferes with the brake drum housing or adjacent mechanism and that substantially no more space is occupied or required when employing my shaft and adjustable bearings than that required by constructions heretofore employed in the art.

It is to be understood that a single adjustable bearing may be employed within the boss 11 to engage the central portion of the shaft and have the shaft retained in fixed relation to the boss or bosses 14 in such manner as described and illustrated in the above mentioned co-pending application.

It will thus be seen that I have provided adjustable bearings for the shaft of a steering knuckle which are constantly biased into intimate engagement with the shaft to compensate for the wear occurring between their engaging surfaces. By having the engaging surface between the wedges and the bearing shells of semi-cylindrical shape and of substantially the same radius the engagement between the bearing shells and the wedges occur substantially at all points throughout their engaging surfaces irrespective of their relation longitudinally of each other. As the bearing engages the shaft with a constant pressure and retains the shaft in centrally aligned relation with respect to the bosses, irrespective of the amount of wear between the rubbing surfaces, it is apparent that the shimmying of the wheels is entirely eliminated, and the difficulty heretofore experienced in retaining the wheels in proper alignment is no longer experienced, when my steering knuckle construction is employed.

While I have described and illustrated but a single embodiment of my invention, it will be apparent to anyone skilled in the art that many changes, omissions, additions and substitutions may be made therein without departing from the spirit and scope of my invention, as set forth in the accompanying claims.

I claim as my invention:

1. A steering knuckle including the spindle and axle of an automotive vehicle having a shaft extending within aligned hollow bosses on said shaft and spindle, means for retaining said shaft in fixed relation with at least one of said bosses and self-adjusting bearings and wedges, each having angularly disposed inner and outer cylindrical surfaces engaging and supporting the end of the shaft in at least one other of said bosses.

2. A steering knuckle including the spindle and axle of an automotive vehicle having a shaft extending within aligned hollow bosses on said shaft and spindle, a bearing shell having angularly disposed inner and outer cylindrical surfaces engaging a portion of the surface of the shaft, a wedge having angularly disposed inner and outer cylindrical surfaces and positioned between said shell and the wall of the hollow portion of the boss and means engaging the other portion of the shaft and said wall.

3. A steering knuckle including the spindle and axle of an automotive vehicle having a shaft extending within aligned hollow bosses on said shaft and spindle, a bearing shell engaging a portion of the surface of the shaft having an outer cylindrical surface angularly disposed relatively to the shaft, a wedge between said shell and wall of the hollow portion of a boss having an inner cylindrical surface encompassing the outer surface of said shell, means engaging the other portion of the shaft in said wall and means for biasing said wedge between said shell and wall.

4. A steering knuckle including the spindle and axle of an automative vehicle having a shaft extending within aligned hollow bosses on said shaft and spindle, two bearing shells having angularly disposed inner and outer cylindrical surfaces engaging the surface of the shaft, two wedges having angularly disposed inner and outer cylindrical surfaces for engaging said shells and the wall of the hollow portion of a boss and means for biasing said wedges between said shells and wall.

5. A steering knuckle including the spindle and axle of an automotive vehicle having a shaft extending within aligned hollow bosses on said shaft and spindle, means for retaining said shaft in fixed relation to at least one of said bosses, two bearing shells engaging the surface of the shaft having angularly disposed inner and outer cylindrical surfaces, two wedges having angularly disposed inner and outer cylindrical surfaces and provided between said shells and the walls of the hollow portion of the bosses on said spindle and automatic means for biasing said wedges longitudinally of the shaft between said shells and walls.

6. A steering knuckle including the spindle and axle of an automotive vehicle having a shaft extending within aligned hollow bosses on said shaft and spindle, means for retaining said shaft in fixed relation to the central boss, two bearing shells surrounding and embracing said shaft, the outer surface of said bearing shells being semi-cylindrical, two substantial semi-cylindrical wedges having an outer surface of cylindrical shape to fit the hollow wall of the bosses of the spindle and an inner surface of semi-cylindrical shape to fit the outer surface of said bearing shells, the axes of said surface being angularly disposed relative to each other and means for causing relative movement between said bearing shells and wedges for tightening said bearing shells around the ends of said shaft.

7. A steering knuckle including the spindle and axle of an automotive vehicle having a shaft extending within aligned hollow bosses on said shaft and spindle, a bearing shell engaging a portion of the surface of the shaft, the outer surface of which is semi-cylindrical, a wedge between said shell and the wall of the hollow portion of a boss, having an outer surface of cylindrical shape to conform to the shape of said wall, and an inner surface of semi-cylindrical shape to conform to the outer surface of said bearing shell, the axes of said surfaces being angularly disposed relative to each other, and means engaging the other portion of said shaft and said wall.

8. A steering knuckle including the spindle and axle of an automotive vehicle having a shaft extending within aligned hollow bosses on said axle and spindle, a bearing shell engaging a portion of the surface of the shaft, the outer surface of which is semi-cylindrical, a wedge between said shell and the wall of the hollow portion of a boss, having an outer surface of cylindrical shape to conform to the surface of said wall, and an inner surface of semi-cylindrical shape to conform to the outer surface of said bearing shell, the axes of said surfaces being angularly disposed relative to each other, means engaging the other portion of said shaft and said wall, and automatic means for biasing said wedge between said shell and wall.

9. A steering knuckle including the spindle and axle of an automotive vehicle having a shaft extending within aligned hollow bosses two of which form a yoke on the spindle which spans the boss on the shaft, two bearing shells surrounding and engaging each end of the shaft and provided within the hollow bosses on the spindle, the outer surface of said bearing shell being semi-cylindrical, two wedges having outer surfaces of cylindrical shape to fit the wall of the hollow portion of the bosses and an inner surface of semi-cylindrical shape to fit the outer surface of said bearing shell, the axes of said surfaces being angularly disposed relative to each other and automatic means for causing relative movement between said bearing shells and wedges for tightening said bearing shells around said shaft.

10. A steering knuckle including the spindle and axle of an automotive vehicle having a shaft extending within aligned hollow bosses two of which form a yoke on the spindle which spans the boss on the shaft, two bearing shells surrounding and engaging each end of the shaft and provided within the hollow bosses on the spindle, the outer surface of said bearing shell being semi-cylindrical, two wedges having outer surfaces of cylindrical shape to fit the wall of the hollow portion of the bosses and an inner surface of semi-cylindrical shape to fit the outer surface of said bearing shell, the axes of said surfaces being angularly disposed relative to each other, automatic means for causing relative movement between said bearing shells and wedges for tightening said bearing shells around said shaft and means for retaining the shaft in fixed relation to the boss on the axle.

JOHN B. MILLIGAN.